United States Patent Office 3,790,581
Patented Feb. 5, 1974

3,790,581
N-{1-[3-CYANO - 3,3 - BIS(OPTIONALLY SUBSTITUTED PHENYL)PROPYL] - 4-PHENYLPIPERIDINE-4-CARBONYLOXY}SUCCINIMIDES
Eunice M. Kreider, Chicago, Ill., assignor to
G. D. Searle & Co., Chicago, Ill.
No Drawing. Continuation-in-part of abandoned application Ser. No. 262,325, June 13, 1972. This application Aug. 17, 1972, Ser. No. 281,441
Int. Cl. C07d 29/32
U.S. Cl. 260—293.71        5 Claims

ABSTRACT OF THE DISCLOSURE

Preparation of the subject compounds by reaction of 1-[3-cyano-3,3-bis(optionally substituted phenyl)propyl]-4-phenylpiperidine-4-carboxylic acid with an N-hydroxy compound of the type

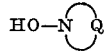

wherein

represents an optionally substituted monocyclic- or fused polycyclic-heterocyclic radical containing at least one carbonyl function adjacent to the nitrogen atom, in the presence of a suitable dehydrating agent, and their unexpected utility as narcotic antagonists are disclosed.

This application for Letters Patent is a continuation-in-part of applicant's prior copending application, Ser. No. 262,325, deposited June 13, 1972, and now abandoned.

The present invention relates to N-{1-[3-cyano-3,3-bis (optionally substituted phenyl)propyl] - 4 - phenylpiperidine-4-carbonyloxy}imides and related compounds of the following general structural formula

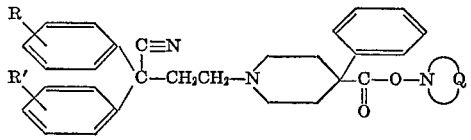

wherein

represents an optionally substituted monocyclic- or fused polycyclic-heterocyclic radical containing at least one carbonyl function adjacent to the nitrogen atom, wherein R is selected from the group consisting of halogen, lower alkylthio, lower alkoxy, lower alkanoyl, di(lower alkyl) amino, trifluoromethyl, lower alkylsulfonyl, and cyano radicals, and wherein R' is selected from the group consisting of a hydrogen atom and halogen, lower alkylthio, lower alkoxy and cyano radicals.

Illustrative of the radicals represented by

are succinimido, glutarimido, phthalimido, endo-5-norbornene - 2,3 - dicarboximido, 3,4-dihydro-4-oxo-1,2,3-benzotriazin-3-yl, and 3,4-dihydro-4-oxo-quinazolin-3-yl. The quinazolinyl radical can be optionally substituted, for example, with a bromine atom at positions 5 through 7, and with a methyl or phenyl radical at the 2-position. Additional radicals represented by

include 3,4-dihydro-3-oxo-2H-1,4-benzoxazin - 4 - yl and 3,4-dihydro-3-oxo-2H-1,4-benzothiazin-4-yl and the corresponding 2-(o-chlorobenzylidene), 6 - chloro, 6-chloro-2-methyl, 6-bromo, 2-ethyl, 2-methyl, 2,2-dimethyl, 2-carboxymethyl and 2-carboxymethyl-6-methyl derivatives; 2-oxoindol-1-yl, optionally containing an oxo, phenyl or benzylidene substituent at the 3-position; 4,5,6,7-tetrahydro - 4,6 - dioxo-3-methylisothiazolo[5,4-d]pyrimidin-5-yl; 1,2,3,4 - tetrahydro - 1,3 - dioxoisoquinolin-2-yl; 3-cyano-1,2-dihydro - 1 - oxoisoquinolin-2-yl; 9,10-dihydro-5,10-dioxo-4-oxa-9-azapyren-9-yl; 3 - carboxy - 1,2 - dihydro-2-oxo-1,8-naphthyridin - 1 - yl; and 4 oxopyridopyrimidin-3-yl radicals, the latter preferably containing a methyl substituent at the 2-position and optionally containing additional methyl groups on the pyridine or pyrimidine portion of the radical. Specific illustrations of such pyridopyrimidin-3-yl radicals are 3,4-dihydro-4-oxo-2,6,8 - trimethylpyrido[3,4-d]pyrimidin-3-yl; 2-methyl-4-oxopyrido[3,2-d]pyrimidin - 3 - yl; and 2-methyl-3,4-dihydro-4-oxopyrido[3,2-d]pyrimidin-3-yl.

The halogen radicals can be selected from chloro, bromo, fluoro and iodo. The lower alkylthio, lower alkoxy, lower alkanoyl, di(lower alkyl)amino, and lower alkylsulfonyl radicals are those of the type:

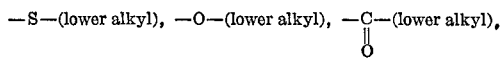

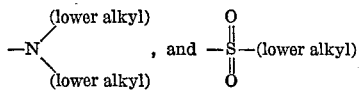

respectively.

The lower alkyl radicals contained in said radicals are exemplified by methyl, ethyl, propyl, butyl, pentyl, hexyl, heptyl and the branch-chained groups isomeric therewith. Thus, for example, the lower alkanoyl radicals denoted above are typified by formyl, acetyl, propionyl, butyryl, valeryl, caproyl, heptanoyl and the corresponding branch-chain groups.

The compounds of Formula I can be prepared by the following sequence of synthetic steps from starting materials of the general structural formula:

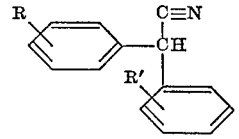

(II)

wherein R and R' are here and throughout the text defined as hereinabove. Those bis(optionally substituted phenyl) acetonitriles are reacted with a dihaloalkane having the formula X—CH$_2$CH$_2$—X (VI), wherein X represents a halogen radical selected from the group consisting of bromo, chloro, iodo or fluoro to afford the corresponding halonitrile of the following general structural formula

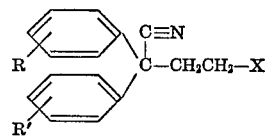

(III)

wherein X is defined as above. This reaction is suitably conducted in the presence of a strong base that does not interfere with the reactants such as sodium amide or sodium hydride. A suitable solvent medium is a non-protic solvent such as dimethylsulfoxide, acetonitrile or an aromatic hydrocarbon, e.g. benzene. Illustrative of this reaction is Example 1, paragraph (B).

The sequence next proceeds by the addition to the aforesaid product of Formula III of a compound of the following formula

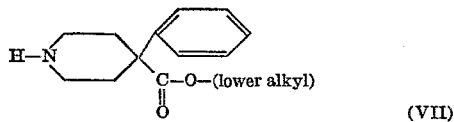

wherein the term lower alkyl is defined as hereinbefore but preferably contains no greater than seven carbon atoms. This reaction step is conducted in a suitable organic solvent, e.g. an aromatic hydrocarbon such as benzene, toluene or xylene or preferably a lower alkanone such as 2-methyl-4-pentanone. Preferably, the reaction proceeds in the presence of an appropriate quantity of a weak base, e.g. an alkali metal carbonate such as sodium carbonate, potassium carbonate or a tertiary aliphatic or aromatic amine such as triethylamine or pyridine. The presence of a catalytic quantity of potassium iodide or sodium iodide is also desirable. Conveniently, the reaction is conducted as reflux for periods of 6–96 hours to provide a lower alkyl ester of the formula

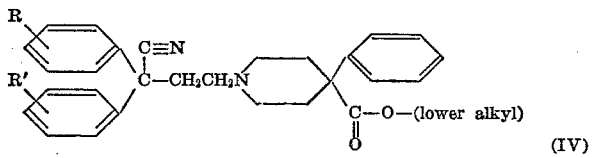

wherein the lower alkyl radicals are defined as hereinabove. Example 1, paragraph (C) is illustrative of this procedure.

Aqueous alcoholic alkaline hydrolysis, at reflux temperatures, of the esters of Formula IV provides the corresponding acids of a Formula V.

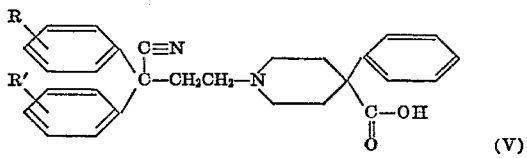

Example 5 is illustrative of this procedure.

The reaction sequence is completed by the addition of a compound of the formula

to the acid precursor of Formula V to afford the corresponding compound to Formula I. This reaction is conducted in the presence of a suitable dehydrating agent such as an aromatic carbodiimide, e.g., diphenylcarbodiimide; an aliphatic carbodiimide e.g. diethylcarbodiimide, or preferably, dicyclohexylcarbodiimide. Other dehydrating agents which may be suitable include bases such as sodium carbonate and acids such as sulfuric acid, hydrochloric acid and toluenesulfonic acid. Other possible dehydrating agents may include trifluoroacetic anhydride and borontrifluoride etherate. Time, temperature and pressure are not critical factors for the conduct of this reaction; however, the reaction is preferably conducted initially at slightly elevated temperatures, e.g., between 40°–60° C. and conveniently at atmospheric pressure. Typical reaction times vary between three hours and three days and are dependent upon the particular temperature and reactants selected. Suitable solvents are non-protic solvents (i.e. solvents containing no acidic hydrogen atoms) which are capable of dissolving the acid of Formula V at the temperature employed. Such suitable solvents include dimethylformamide, dimethylacetamide, and hexamethylphosphoramide. Among the examples illustrating this procedure is Example 9.

Alternatively, this step may be conducted with the acid chloride corresponding to the acid precursor of Formula V. In that event the reaction is conveniently conducted in the presence of a suitable base. Preferred bases for use in this reaction include tertiary aliphatic or aromatic amines, e.g. N-methylmorpholine, triethylamine, pyridine and picoline. The reaction is conveniently carried out at atmospheric pressure, at a temperature ranging from room temperature to reflux and for a time period of 5 minutes to 24 hours. However, time, temperature and pressure are not critical factors in conducting the reaction. Suitable solvents are non-protic solvents, e.g. dimethylformamide, dimethylacetamide, hexamethylphosphoramide, dimethylsulfoxide, tetrahydrofuran, acetonitrile, benzene and the like.

Said acid chloride starting material is conveniently prepared from the corresponding acid of Formula V by reaction with thionyl chloride in an inert solvent such as tetrahydrofuran, optionally in the presence of dimethylformamide. The acid chloride is particularly useful in the form of the corresponding hydrohalide salt, especially the hydrochloride. Notably, the acid chloride is the starting material of choice when the N-hydroxy compound of Formula VIII contains reactive substituents, e.g. carboxymethyl or carboxy groups.

The starting materials of Formula II wherein the meanings of R and R' are limited as follows: R' represents hydrogen while R represents a lower alkanoyl, di-(lower alkyl)amino, trifluoromethyl, lower alkylsulfonyl or halogen atom, can be prepared by the following sequence of reactions. An aldehyde of the formula

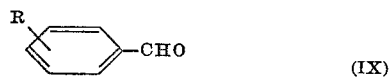

is treated with potassium cyanide in the presence of hydrochloric or hydrobromic acid to afford an intermediate, preferably unisolated, of the formula

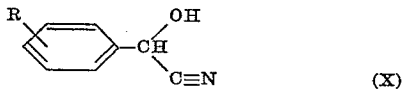

This reaction is most suitably conducted at cold temperatures, e.g. between 0° and 15° C. Treatment of said intermediate of Formula X with benzene in the presence of a dehydrating medium such as a strong acid that does not interfere with the reactants, e.g. concentrated sulfuric acid, provides the desired starting material of Formula II. This reaction is also most suitably conducted at cold temperatures e.g. between 0° and 15° C. Both steps of this reaction sequence are illustrated in Example 1, paragraph (A) of the examples following. By utilizing a halo-substituted phenyl compound in the second step of this sequence there can also be obtained the bishalo derivatives of Formula II, as typified by the reactions set forth in Example 2 hereof.

Those starting materials of Formula II wherein R is a halogen atom, a lower alkoxy, cyano or lower alkylthio radical and R' is hydrogen or a halogen atom, lower alkoxy, cyano or lower alkythio radical can be prepared by bromine addition to a compound of the general formula

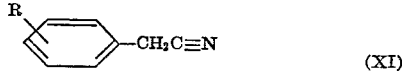

providing a preferably unisolated intermediate of the formula

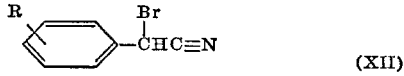

which is thereafter treated with the desired phenyl reactant of the formula

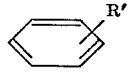

in the presence of anhydrous aluminum chloride. The bromine addition is carried out at 60–90° C. with rate of addition such that instantaneous reaction occurs and no appreciable concentration of bromine is allowed to occur. The phenyl reactant addition with anhydrous aluminum chloride or aluminum bromide in an inert solvent such dichloromethane is promoted by refluxing. This reaction sequence is typified by the synthetic steps described in Example 12, paragraph (A) and (B), respectively.

Equivalent to the free bases of Formula I for the purposes of this invention are the non-toxic pharmaceutically acceptable acid addition salts thereof. Such salts include those derived from inorganic acids such as hydrochloric, hydrobromic, hydroiodic, sulfuric, phosphoric, nitric, and sulfamic; and from organic acids such as acetic, citric, lactic, maleic, malic, succinic, tartaric, cinnamic, benzoic, gluconic, ascorbic, salicyclic, ethane disulfonic, fumaric, glycolic, and related acids.

The compounds of the present invention possess valuable pharmacological properties. They display, for example, narcotic antagonist properties of the type described in the literature for nalorphine (N-allylnormorphine). Thus, they can prevent or promptly abolish many of the actions of morphine, in the non-addicted mammal. Illustratively morphine-induced euphoria, analgesia, drowsiness, respiratory depression, muscular incoordination, vomiting, defecation, bradycardia, hypothermia, antidiuresis, miosis, and hyperglycemia, can be readily antagonized in various appropriate species by such representative compounds of this invention as N-{1-[3-cyano-3,3-bis-(4-chlorophenyl)propyl] - 4 - phenylpiperidine-4-carbonyloxy}succinimide and N - {1 - [3 - cyano-3-(4-bromophenyl)-3-phenylpropyl] - 4 - phenylpiperidine - 4 - carbonyloxy}succinimide. Similarly these representative species mimic the effects of nalorphine in mammals actively addicted to morphine or a synthetic narcotic by antagonizing the depressant effects of the narcotic, thus unmasking the signs of physical dependence, that is precipitating the abstinence syndrome. As a result of these properties, compounds of this invention, like nalorphine, can prove effective in treating acute poisoning from morphine, its derivatives and synthetic narcotics. Moreover, said advantageous properties are also surprising since structurally related compounds, such as the compound of Formula V wherein R and R' each represent hydrogen, have been observed to exhibit agonist behavior. In the below described assay, the narcotic antagonist properties of the two aforementioned representative species of this invention are observed.

The procedure—essentially that described by Eddy et al. in J. Pharmacol. Exp. Therap., 107, 385 (1953)—is to determine the time required for each of a group of 10 adult, male, albino, Charles River mice weighing 18–25 grams to lick a foot or jump when placed within a restraining cylinder on a plate heated to maintain it at 55±0.3° C. Determinations are made at intervals 60, 40 and 20 minutes before the first injection and at 30, 60, 90 and 120 minutes after that injection. The first injection consists of 20 milligrams per kilogram (mg./kg.) or more of morphine, administered intraperitoneally, and is followed, after 15 minutes, by intraperitoneal or intragastric administration of a selected dose of the test compound. Solid compounds are prepared for injection by mixing 25 mg. with approximately 0.2 milliliter (ml.) of a 50:50 (by volume) mixture of propylene glycol and Tween 80 [polyoxyethylene (20) sorbitan monooleate] then diluting to 5 ml. with water and homogenizing; liquid compounds are prepared by warming 25 milligrams (mg.) with 1 ml. of 50:50 (by volume) propylene glycol and Tween 80, then diluting to 5 ml. with aqueous 10% gum acacia. Control animals are treated identically with normal saline instead of with test compound in carrier. Morphine produces a strong analgesic response and significantly prolongs the reaction time of the test animals to thermal pain. A narcotic antagonist such as naloxone or nalorphine will reverse the analgesic activity of morphine. This test measures the capacity of a test compound, when administered at the peak of the ongoing analgesic response to morphine, to reverse the analgesic response produced by morphine to pre-morphine levels.

When tested according to this procedure, control animals exhibited the following behavior: 80% of the mice doubled their reaction time 30 minutes post morphine injection; 60% doubled their time 60 minutes post morphine; 30% doubled their time 90 minutes post morphine; and 40% doubled their time 120 minutes after morphine injection. In contrast, at 25 mg./kg. (administered intragastrically), a representative species, N-{1-[3-cyano - 3,3 - bis(4-chlorophenyl)propyl]-4-phenylpiperidine-4-carbonyloxy}succinimide hydrochloride with one-half mole of isopropanol, significantly antagonized the narcotic effect of morphine, causing only the following percentages of mice to double their reaction time: 20% at 30 minutes post morphine injection; 10% at 60 minutes post morphine; 10% at 90 minutes post morphine; and 10% at 120 minutes post morphine. Similarly, the representative compound N-{1-[3-cyano-3-(4-bromophenyl) - 3 - phenylpropyl] - 4 - phenylpiperidine - 4 - carbonyloxy}succinimide hydrochloride showed significant antagonism of morphine. Administered intragastrically at a dose level of 25 mg./kg., said bromo-representative species caused only the following percentages of mice to double their reaction time: 40% at 3 minutes post morphine injection; 27% at 60 minutes post morphine; 20% at 90 minutes post morphine; and 10% at 120 minutes post morphine. A structurally related known compound 1-(3-cyano - 3,3 - diphenylpropyl) - 4 - phenylpiperidine-4-carboxylic acid hydrochloride, when tested in this manner at a dose level of 25 mg./kg. (administered intragastrically), lacked the narcotic antagonism of morphine exhibited by the representative compounds of the present invention.

The following examples are given for the purpose of illustrating the preparation of the compounds of the present invention. It will be understood that the invention is not to be construed as limited in spirit or in scope by the details contained therein, as many modifications in materials and methods will be apparent from this disclosure to those skilled in the art. In the following examples and throughout this application, temperatures are given in degrees centigrade (° C.).

EXAMPLE 1

(A) To a mixture of 80 grams of p-chlorobenzaldehyde in 175 milliliters of ether, which mixture was maintained in an ice bath, with stirring, was added, portion-wise over a period of two hours, 66.4 grams of dried potassium cyanide and 66 grams of concentrated hydrochloric acid. Throughout the addition period the temperature of the reaction mixture is maintained below 10°. After addition is complete, the mixture is stirred for about one hour, while permitting the temperature to rise to 15°. At that temperature an exothermic reaction occurs causing the ether to reflux. The resultant two-phase system is stirred for an additional hour, after which time the solid is filtered off and washed with ether. The combined organic solutions are separated from any aqueous phase present, washed with 50 milliliters of saturated aqueous sodium bisulfite, dried over sodium sulfate, and condensed in vacuo using a warm water bath, to give a light yellow liquid. To this product is added 140 grams of anhydrous benzene. The resultant solution is slowly added, over a period of about one hour, to 280 grams of concentrated sulfuric acid which is maintained under stirring in an ice bath at a temperature below 15°. Upon completion of the addition, the reaction mixture is stirred for an additional hour, allowing the mixture to warm to room temperature. It is thereafter poured onto 750 grams of ice and the product is extracted with benzene. The benzene solution is washed, first with water, then with dilute aqueous sodium bicarbonate, dried over potassium carbonate and concentrated to half its volume. Addition of Skellysolve B (essentially N-hexanes boiling at about 60–80°), followed by cooling resulted in the formation of phenyl-(4-chlorophenyl)-acetonitrile, melting at about 70–72°.

(B) To 100 grams of the foregoing nitrile product dissolved in 325 milliliters of anhydrous benzene was added 18 grams of sodamide. The mixture was refluxed under calcium chloride for twenty-four hours, and cooled to room temperature. To the reaction mixture was thereupon added 85 grams of 1,2-dibromoethane and refluxing was continued for an additional six hours. Addition of 300 milliliters of water and separation of the layers gave a benzene solution which was thereafter washed with aqueous sodium chloride and with water. Upon drying under sodium sulfate and evaporation to a liquid residue there was obtained 2-phenyl-2-(4-chlorophenyl)-4-bromobutyronitrile.

(C) A mixture of 60 grams of the foregoing bromo product combined with 60 grams of ethyl 4-phenylpiperidine-4-carboxylate, 30 grams of sodium carbonate and a few crystals of potassium iodide was refluxed in 300 milliliters of 2-methyl-4-pentanone under calcium chloride for about 24 hours. At the end of that time the reaction mixture was diluted with 300 milliliters of water and the organic layer was removed, washed with water and dried under potassium carbonate. Concentration thereof afforded a heavy liquid residue. This product was chromatographed on silica gel, eluting with a 2 to 1 mixture of benzene-Skellysolve B, benzene and 10% ethylacetate-benzene. The eluates from the benzene and 10% ethylacetate-benzene mixture were concentrated and combined in 2-isopropoxypropane. The ether solution was acidified with 6.5 normal hydrochloric acid in 2-propanol and chilled to give a precipitate. Upon recrystallization twice from a mixture of 2-propanol and 2-isopropoxypropane containing decolorizing carbon, and finally from a mixture of ethyl acetate and ether containing decolorizing carbon, there was obtained ethyl 1-[3-cyano-3-(4 - chlorophenyl)-3-phenylpropyl]-4-phenylpiperidine-4 - carboxylate hydrochloride, melting at about 179–181°.

EXAMPLE 2

Substitution of 45 grams of 4-chlorobenzaldehyde, 39 grams of potassium cyanide and 36 grams of concentrated hydrochloric acid for the quantities of the same reactants employed in the first step of Example 1(A), followed by addition to the product thereof of 143 grams of chlorobenzene and 156 grams of concentrated sulfuric acid, the reactions being performed generally in accord with the procedure described in Example 1(A), afforded in like manner bis(4-chlorophenyl)-acetonitrile. This nitrile product was then reacted with 10.4 grams of sodium amide and 49 grams of 1,2-dibromoethane according to the procedure of Example 1(B) to yield 2,2-bis(4-chlorophenyl)-4-bromobutyronitrile as a crude residue. That crude residue was further contacted with 45 grams of ethyl 4-phenylpiperidine-4-carboxylate and 22 grams of sodium carbonate and a few crystals of potassium iodide dissolved in 200 milliliters of 2-methyl-4-pentanone. Chromatographic purification of the product resulting from this reaction in a manner similar to that described in Example 1(C), ethyl 1-[3-cyano-3,3-bis(4-chlorophenyl) propyl]-4-phenylpiperidine-4 - carboxylate hydrochloride with one-half mole of 2-propanol. This compound melted at about 135–140° with decomposition.

EXAMPLE 3

By employing a procedure similar to that utilized in Example 1, paragraphs (A), (B), and (C) there was obtained ethyl 1 - [3 - cyano-3-(4-bromophenyl)-3-phenylpropyl]-4-phenylpiperidine-4 - carboxylate hydrochloride melting at about 118–120°. The reactants used in the first step described in Example 1(A) were: 25 grams of 4-bromobenzaldehyde, 16.2 grams of potassium cyanide and 17 grams of concentrated hydrochloride acid; in the second step: 43 grams of benzene and 63 grams of concentrated sulfuric acid to afford phenyl(4-bromophenyl) acetonitrile, according to the reactions described in Example 1(A). That nitrile was thereafter reacted with 4.2 grams of sodium amide and 20 grams of 1,2-dibromoethane to give 2-phenyl-2-(4-bromophenyl)-4-bromobutyronitrile in accord with the procedure of Example 1(B). Further reaction of this butyronitrile product with 24 grams of ethyl 4-phenylpiperidine-4-carboxylate, 10 grams of sodium carbonate and a few crystals of potassium iodide dissolved in 150 milliliters of 2-methyl-4-pentanone gave the crued product which was chromatographed and subsequently acidified. Upon recrystallization, twice from a mixture of 2-propanol and 2-isopropoxypropane containing decolorizing carbon, there was obtained the aforestated product, which melted at about 118–120°.

EXAMPLE 4

Upon substitution of 66.6 grams of 4i-fluorobenzaldehyde, 150 milliliters of ether, 65 grams of potassium cyanide and 65 grams of concentrated hydrochloric acid into the procedure described in the first step of Example 1(A), followed by treatment of the product thereof with 140 grams of benzene and 250 grams of concentrated sulfuric acid afforded, according to the procedure of the second step of Example 1(A) as the primary product, phenyl (4-fluorophenyl)acetonitrile. This primary product was isolated from the benzene Skellysolve B solution by evaporation, after precipitation of the carboxyamide secondary product on cooling. Isolation was affected by evaporating all the solvents from the filtrate. The primary product was then reacted with 17 grams of sodium amide and 78 grams of 1,2-dibromoethane to afford, in accord with the procedure of Example 1(B), 2-phenyl-2-(4-fluorophenyl)-4-bromobutyronitrile. That nitrile was treated according to the procedure of Example 1(C) with 64.5 grams of ethyl 4-phenylpiperidine-4-carboxylate, and 30 grams of sodium carbonate and a few crystals of potassium iodide in 100 milliliters of 2-methyl-4-pentanone. Chromatography of the resultant residue, followed by recrystallization from a mixture of 2-propanol and 2-isopropoxypropane containing decolorizing carbon yielded ethyl 1 - [3 - cyano-3-(4-fluorophenyl)-3-phenylpropyl] - 4 - phenylpiperidine-4-carboxylate hydrochloride, with one-half mole of 2-propanol. A melting point of about 113–116° was observed, with decomposition, for that product.

EXAMPLE 5

1.4 grams of ethyl 1-[3-cyano-3-(4-chlorophenyl)-3-phenylpropyl]-4-phenylpiperidine-4-carboxylate was refluxed in a solution of 0.33 gram of potassium hydroxide in 1 milliliter of water and 25 milliliters of methanol for about 24 hours. To that solution was then added 4 milliliters of 4 N potassium hydroxide and refluxing was continued for a second 24 hour period. The solution was thereafter acidified with glacial acetic acid, cooled, and the precipitate which formed was collected and washed with water. To puirfy the solid collected, it was redissolved in dilute (about 1 N) aqueous potassium hydroxide. Insoluble material discharging therefrom was filtered off and the filtrate was reacidified with glacial acetic acid. This precipitate was washed with water, dried and recrystallized from a mixture of 2-propanol, dimethylformamide and water to afford the acid 1-[3-cyano-3-(4-chlorophenyl)-3-phenylpropyl]-4 - phenylpiperidine - 4-carboxylic acid, which softened with bubbling at about 140–150°; rehardened and melted at about 230°. The acid product obtained above was taken up in a mixture of 2-propanol and chloroform, and the resulting solution was acidified with 6.5 N hydrochloric acid in 2-propanol. Dilution with ether, followed by cooling afforded a precipitate which was recrystallized from a mixture of 2-propanol and 1-butoxybutane, to yield 1-[3-cyano - 3 - (4 - chlorophenyl)-3-phenylpropyl[-4-phenyl-piperidine-4-carboxylic acid hydrochloride with one and a half moles of water. This product was characterized

EXAMPLE 6

In a manner similar to that described in Example 5, 105 grams of ethyl 1-[3-cyano-3-(4-fluorophenyl)-3-phenylpropyl]-4-phenylpiperidine-4-carboxylate was dissolved in 350 milliliters of methanol. To that solution was added 375 milliliters of 6 N sodium hydroxide and refluxing was conducted for an 18 hour period. The resulting suspension was cooled, acidified with dilute acetic acid, and the precipitate was collected and washed with water. The product was partially purified by redissolving it in dilute aqueous sodium hydroxide, washing the aqueous solution three times with ether, and reacidifying it with glacial acetic acid. Thereafter, the precipitate was again collected, washed with water and dried to a solid foam, in vacuo. The hygroscopic product obtained was 1-[3-cyano-3-(4-fluorophenyl) - 3 - phenylpropyl] - 4 - phenylpiperidine-4-carboxylic acid.

EXAMPLE 7

In a manner similar to the procedure described in Example 5, 16.3 grams of ethyl 1-[3-cyano-3,3-bis(4-chlorophenyl)propyl] - 4 - phenylpiperidine-4-carboxylate suspended in 400 milliliters of methanol, was treated with 14 grams of sodium hydroxide dissolved in 122 milliliters of water. The solution was refluxed for 20 hours, cooled and acidified to a pH of 6 with glacial acetic acid. The precipitate which formed after standing for 1 hour, was collected and washed with 100 milliliters of a mixture in the ratio of 90:10 of water and acetone, followed by acetone alone. Thereafter, a portion was washed again with acetone and dried to yield 1-[3-cyano-3,3-bis(4-chlorophenyl)propyl] - 4 - phenylpiperidine-4-carboxylic acid, hemihydrate melting at about 230–235° with decomposition.

EXAMPLE 8

Following generally the procedure of Example 5, 8.4 grams of ethyl 1-[3-cyano-3-(4-bromophenyl)-3-phenylpropyl]-4-phenylpiperidine-4-carboxylate, dissolved in 125 milliliters of methanol, was treated with 53 milliliters of 3 N sodium hydroxide and the resulting solution was refluxed for 18 hours. The suspension which formed was cooled and acidified with glacial acetic acid to a pH of 6. The precipitate thus formed was collected, washed with 100 milliliters of a mixture of water and acetone in the ratio of 90:10, and washed again with 100 milliliters of a mixture of acetone and ether in the ratio of 50:50. The product thus obtained was dried to yield as a crude material, 1-[3 - cyano - 3 - (4-bromophenyl)-3-phenylpropyl]-4-phenylpiperidine-4-carboxylic acid, softening at 140° and foaming at about 180° with decomposition.

EXAMPLE 9

To 2.5 grams of 1-[3-cyano-3,3-bis(4-chlorophenyl) propyl]-4-phenylpiperidine-4-carboxylic acid, suspended in 75 milliliters of warm, redistilled N,N-dimethylformamide, was added 0.63 gram of recrystallized N-hydroxysuccinimide, followed by 1.2 grams of dicyclohexylcarbodiimide. The resulting reaction mixture was stirred at room temperature under anhydrous conditions for about 36 hours, then cooled to approximately 5° and filtered to remove the dicyclohexylurea precipitate. The filtrate was diluted with water and again filtered to remove additional precipitate. The filtrate was dilute with water and again filtered to remove additional precipitate. Extraction of the resulting filtrate with ethyl acetate, followed by washing of the organic layer three times with water, afforded a residue which was dried over anhydrous sodium sulfate and concentrated to about half volume. The resulting concentrate was acidified with 6.5 N hydrochloric acid in 2-propanol and diluted with 2-isopropoxypropane to afford N-{1-[3-cyano-3,3-bis(4-chlorophenyl) propyl] - 4 - phenylpiperidine-4-carbonyloxy}succinimide hydrochloride with one-half mole of 2-propanol. This product is characterized by a melting point of 169–171° with gas evolution, and has the following structural formula

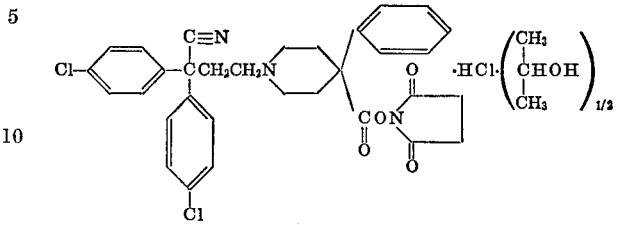

EXAMPLE 10

In like manner to the procedure described in Example 9, 1.5 grams of 1-[3-cyano-3-(4-bromophenyl)-3-phenylpropyl]-4-phenylpiperidine-4-carboxylic acid suspended in 25 milliliters of N,N-dimethylformamide, 0.5 gram of N-hydroxy-succinimide and 0.8 gram of dicyclohexylcarbodiimide were substituted for the reactants therein utilized therein affording N-{1-[3-cyano-3-(4-bromophenyl) - 3 - phenylpropyl]-4-phenylpiperidine-4-carbonyloxy} succinimide hydrochloride. This product foams at about 165°, liquifies at about 190° and is characterized by the following structural formula

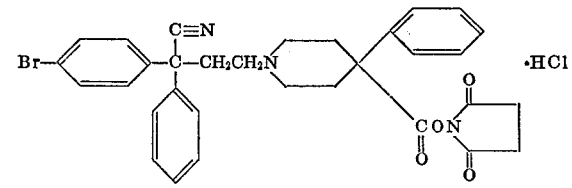

EXAMPLE 11

In like manner, upon substitution of a molecular equivalent quantity of each of the following acid precursors of Formula V for the acid starting material employed in Example 9 above, there is obtained, respectively, the imide products listed below.

Acid starting materials:
    1-[3-cyano-3-(4-chlorophenyl)-3-phenylpropyl]-
        4-phenylpiperidine-4-carboxylic acid
    1-[3-cyano-3-(4-fluorophenyl)-3-phenylpropyl]-
        4-phenylpiperidine-4-carboxylic acid
Imide products:
    N-{1-[3-cyano-3-(4-chlorophenyl)-3-phenylpropyl]-
        4-phenylpiperidine-4-carbonyloxy}succinimide
        hydrochloride
    N-{1-[3-cyano-3-(4-fluorophenyl-3-phenylpropyl]-
        4-phenylpiperidine-4-carbonyloxy}succinimide
        hydrochloride.

EXAMPLE 12

(A) To 58 grams of benzylcyanide, heated to 80°, there was slowly added 88 grams of bromine, maintaining the temperature of the mixture at 80–90°. Throughout the addition the reaction mixture was stirred under anhydrous conditions. Upon completion of the addition, the system was flushed with nitrogen to remove gaseous hydrogen bromide and cooled to room temperature to afford a crude residue.

(B) To 21 grams of aluminum chloride in 100 milliliters of dichloromethane and 32 grams of anisole, there was added 31 grams of the crude bromo compound prepared above in 100 milliliters of dichloromethane. After stirring for about 1 hour at room temperature, the solution was refluxed for a period of 6 to 12 hours, cooled and poured onto 50 milliliters of concentrated hydrochloric acid in ice. The organic layer was separated, washed with water, dilute sodium bicarbonate, dried under anhydrous conditions and concentrated. The resulting residue was taken up in a mixture of benzene and Skellysolve B and cooled to afford an oily semisolid resdue. That residue was twice triturated with ether to afford phenyl(4-methoxyphenyl)acetonitrile, which is characterized by a melting point of 123–125°. (Chromatographic separation of the mother liquor provided phenyl (2 - methoxyphenyl)-acetonitrile, melting at about 833–86°.)

(C) To 6.8 grams of the above cyano compound melting at 123–125°, dissolved in 100 milliliters of anhydrous benzene, there was added 1.8 grams of sodium amide. The resulting suspension was refluxed for about 12–18 hours until evolution of ammonia ceased. Thereafter, it was cooled to room temperature and treated with 10 grams of 1,2-dibromoethane. That reaction mixture was refluxed for about 6–10 hours, cooled and diluted with water. The resultant organic solution was separated, washed with water, dried under anhydrous conditions and concentrated in vacuo to afford 2-phenyl - 2 - (4-methoxyphenyl)-4-bromobutyronitrile.

(D) A mixture of the nitrile compound obtained above, 7.1 grams of ethyl 4-phenylpiperidine-4-carboxylate, a few crystals of potassium iodide and 35 grams of sodium carbonate in 100 milliliters of 2-methyl-4-pentanone was refluxed for about 6–96 hours under anhydrous conditions. The resulting material was cooled, and diluted with 50 milliliters of water to afford an organic solution which was thereafter separated and washed with water, dried and concentrated. Chromatography on silica gel afforded, on elution with a 10% mixture of ethyl acetate in benzene, an oil which was taken up in 2-isopropoxypropane, acidified with a mixture of 6.5 normal hydrochloric acid in 2-propanol and cooled. The precipitate which formed was collected and recrystallized twice from a mixture of 2-propanol and 2-isopropoxypropane to yield ethyl 1-[3-cyano-3-(4-methoxyphenyl)-3-phenylpropyl] - 4 - phenylpiperidine-4-carboxylate hydrochloride with one-half mole of 2-propanol. This product was characterized by a melting point of about 110°, decomposition occurring.

(E) Upon substitution of molecular equivalent quantities of the ethyl ester obtained above for the ethyl ester starting material of Example 5, there was obtained according to the procedure there detailed the corresponding acid, namely 1-[3-cyano-3-(4-methoxyphenyl) - 3 - phenylpropyl]-4-phenylpiperidine - 4 - carboxylic acid. That acid material was thereafter subjected to the esterification procedure described in Example 9, using molecular equivalent quantities of the reactants therein described, to yield N-{1-[3-cyano-3-(4-methoxyphenyl) - 3 - phenylpropyl]-4-phenylpiperidine - 4 - carbonyloxy}succinimide hydrochloride.

What is claimed is:
1. A compound of the formula

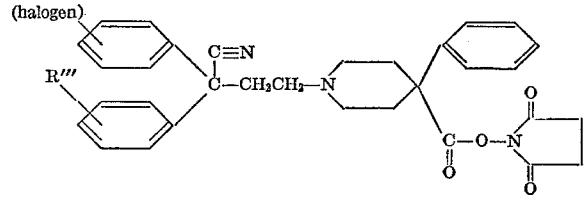

wherein R''' is hydrogen or halogen, or the acid addition salts thereof.

2. A compound according to claim 1 which is N-{1-[3-cyano-3,3-bis(4-chlorophenyl)propyl] - 4 - phenylpiperidine-4-carbonyloxy}succinimide.

3. A compound according to claim 1, which is N-{1-[3-cyano-3,3-bis(4-chlorophenyl)propyl] - 4 - phenylpiperidine-4-carbonyloxy)succinimide hydrochloride.

4. A compound according to claim 1, which is N-{1-[3-cyano-3-(4-bromophenyl)-3-phenylpropyl] - 4 - phenylpiperidine-4-carbonyloxy}succinimide.

5. A compound according to claim 1, which is N-{1-[3-cyano-3-(4-bromophenyl)-3-phenylpropyl] - 4 - phenylpiperidine-4-carbonyloxy}succinimide hydrochloride.

References Cited
UNITED STATES PATENTS

| | | | |
|---|---|---|---|
| 2,898,340 | 8/1959 | Janssen | 260—293.75 |
| 3,497,519 | 2/1970 | Janssen | 260—293.68 |
| 3,646,207 | 2/1972 | Soudyn et al. | 424—266 |

ALAN L. ROTMAN, Primary Examiner

S. D. WINTERS, Assistant Examiner

260—240 R, 243 R, 244 R, 248 AS, 256.4 F, 256.4 Q, 251 A, 251 QA, 281, 287 R, 256.5 R, 293.55, 293.61, 293.73, 293.75, 326 R, 326.16, 326.3, 465 E, 465 F, 465 G, 465 H, 424—246, 248, 249, 251, 258, 267